(12) United States Patent
Yoon et al.

(10) Patent No.: US 9,821,797 B2
(45) Date of Patent: Nov. 21, 2017

(54) CONTROL METHOD OF HYBRID VEHICLE

(71) Applicant: Hyundai Motor Company, Seoul (KR)

(72) Inventors: Young Min Yoon, Suwon-si (KR); Jin Sung Kim, Hwaseong-si (KR); Seung Sam Baek, Jeju-si (KR); Seong Hwan Cheong, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/062,839

(22) Filed: Mar. 7, 2016

(65) Prior Publication Data

US 2017/0101084 A1    Apr. 13, 2017

(30) Foreign Application Priority Data

Oct. 13, 2015    (KR) .................... 10-2015-0142589

(51) Int. Cl.
| | |
|---|---|
| B60W 10/00 | (2006.01) |
| B60W 20/00 | (2016.01) |
| B60L 7/00 | (2006.01) |
| B60L 7/22 | (2006.01) |
| B60W 20/17 | (2016.01) |
| B60W 20/14 | (2016.01) |
| B60W 10/02 | (2006.01) |
| B60W 10/08 | (2006.01) |

(52) U.S. Cl.
CPC ............ *B60W 20/17* (2016.01); *B60W 10/02* (2013.01); *B60W 10/08* (2013.01); *B60W 20/14* (2016.01); *B60W 2520/06* (2013.01); *B60W 2710/028* (2013.01); *B60W 2710/083* (2013.01); *B60Y 2200/92* (2013.01); *B60Y 2300/18033* (2013.01); *B60Y 2300/18125* (2013.01); *B60Y 2300/19* (2013.01); *Y10S 903/93* (2013.01)

(58) Field of Classification Search
CPC ...... B60W 10/02; B60W 10/08; B60W 10/14; B60W 20/00; B60W 20/17
See application file for complete search history.

(56) References Cited

U.S. PATENT DOCUMENTS

| | | | | |
|---|---|---|---|---|
| 9,046,044 B2 * | 6/2015 | Shimada | ................ | B60K 17/35 |
| 9,050,965 B2 * | 6/2015 | Oishi | ................ | B60T 7/042 |
| 9,199,645 B2 * | 12/2015 | Oishi | ................ | B60T 7/042 |

FOREIGN PATENT DOCUMENTS

| | | |
|---|---|---|
| JP | 2013-95165 | 5/2013 |
| JP | 2013-212767 | 10/2013 |
| JP | 2015-112958 | 6/2015 |

(Continued)

*Primary Examiner* — Yonel Beaulieu
(74) *Attorney, Agent, or Firm* — Brinks Gilson & Lione

(57) ABSTRACT

A control method of a hybrid vehicle includes: confirming whether or not the driving mode of the vehicle is an EV mode when a controller senses shift of the position of a shift lever from the position R to the position D or from the position D to the position R; applying reverse-directional motor torque to a motor through the controller so that a motor speed is synchronized with the speed of an engagement-side clutch, as a result of confirmation of the driving mode, if the driving mode of the vehicle is the EV mode; and executing normal driving of the vehicle by applying regular-directional motor torque to the motor through the controller after synchronization of the motor speed with the engagement-side clutch speed.

4 Claims, 4 Drawing Sheets

(56) References Cited

FOREIGN PATENT DOCUMENTS

| | | |
|---|---|---|
| KR | 10-2010-0062637 | 6/2010 |
| KR | 10-1362059 | 2/2014 |
| KR | 10-2014-0046856 | 4/2014 |
| KR | 10-1500374 | 3/2015 |
| WO | 2013/145093 | 10/2013 |

* cited by examiner

CONTROL METHOD OF HYBRID VEHICLE

CROSS-REFERENCE TO RELATED APPLICATION

This application claims the priority to and the benefit of Korean Patent Application No. 10-2015-0142589, filed on Oct. 13, 2015, which is incorporated herein by reference in its entirety.

FIELD

The present disclosure relates to a control method of a hybrid vehicle.

BACKGROUND

The statements in this section merely provide background information related to the present disclosure and may not constitute prior art.

In general, a dual clutch transmission (DCT) includes forward gears and one reverse gear, i.e., an R gear.

If a driver shifts a shift lever from a position D to a position R so as to perform backward driving, a transmission control unit (TCU) engages the R gear and then engages an even-numbered clutch. Here, the TCU releases the pre-selected first gear and may thus inhibit or prevent gear backlash noise generated due to reverse driving. On the other hand, if the driver shifts the shift lever from the position R to the position D so as to perform forward driving, the TCU engages the first gear and then engages an odd-numbered clutch. Here, the TCU releases the R gear and may thus inhibit or prevent noise generated due to forward driving.

According to such control, in a low-speed R-D or D-R lurch driving situation, the TCU frequently engages/releases the first gear and the R gear and, thus, driving responsiveness is delayed and an excessive amount of noise is generated. Particularly, if the driving mode of a vehicle is an EV mode, driving is executed only using a motor and, thus, a driver may more loudly feel noise generated due to gear engagement/release.

SUMMARY

The present disclosure provides a control method of a hybrid vehicle which controls motor torque according to a driving mode of the vehicle, when the vehicle executes lurch driving, so as to improve driving responsiveness of the vehicle.

In accordance with the present disclosure, the control method of a hybrid vehicle includes: confirming whether or not the driving mode of the vehicle is an EV mode, if a controller senses shift of the position of a shift lever from the position R to the position D or from the position D to the position R; applying reverse-directional motor torque to a motor through the controller so that a motor speed is synchronized with the speed of an engagement-side clutch, as a result of confirmation of the driving mode, if the driving mode of the vehicle is the EV mode; and executing normal driving of the vehicle by applying regular-directional motor torque to the motor through the controller after synchronization of the motor speed with the engagement-side clutch speed.

If the motor speed is synchronized with the speed of the engagement-side clutch, the controller may execute regenerative braking of the motor until the motor speed reaches 0 RPM, and then execute normal driving of the vehicle.

The control method may further include executing take-up control by driving the motor at a predetermined torque through the controller so that the motor speed and the engagement-side clutch speed are synchronized, as a result of confirmation of the driving mode, if the driving mode of the vehicle is not the EV mode.

In execution of take-up control, the controller may control the motor torque to be 0 Nm and then drive the motor at the predetermined torque.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
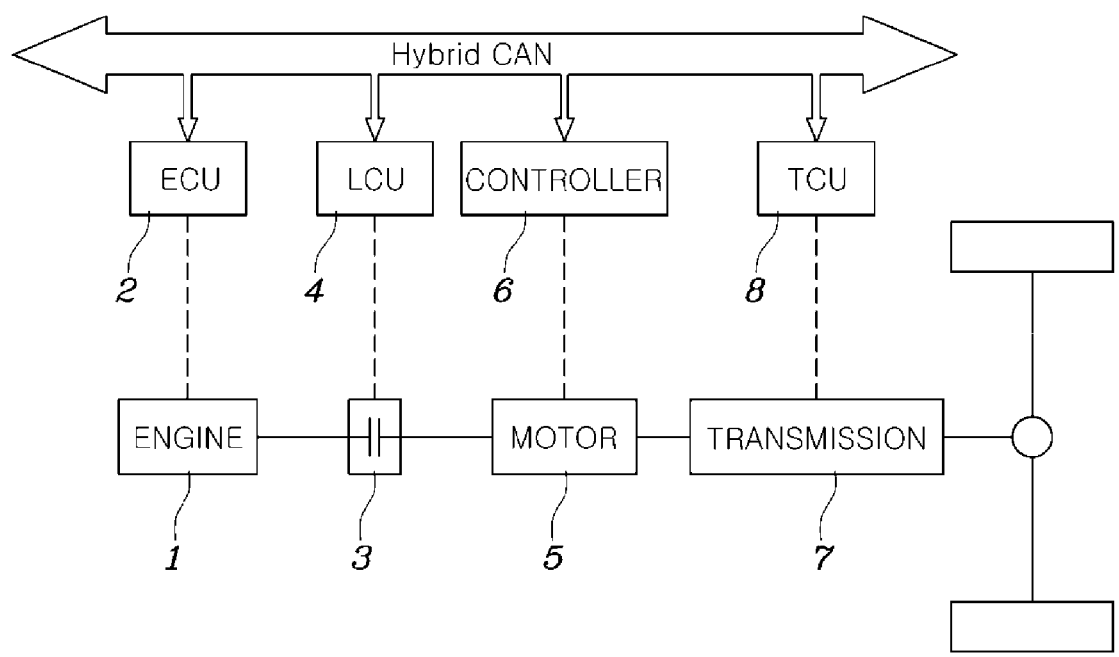
FIG. 1 is a block diagram illustrating control apparatuses of a hybrid vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

First, FIG. 1 is a block diagram illustrating control apparatuses of a hybrid vehicle in accordance with one embodiment of the present disclosure. With reference to FIG. 1, among control apparatuses of a hybrid vehicle, an engine 1, an engine clutch 3, a motor 5 and a transmission 7 are sequentially connected to vehicle wheels. An engine control unit (ECU) 2 is provided to control the engine 1, a local control unit (LCU) 4 is connected to an actuator to control the engine clutch 3, a controller 6 is provided to control the motor 5, and a transmission control unit (TCU) 8 is provided to control the transmission 7. The ECU 2, the LCU 4, the controller 6 and the TCU 8 are provided to transmit/receive control signals through CAN communication. Detailed operations and functions of the above-described control apparatuses of the hybrid vehicle will be described later together with a control method of a hybrid vehicle.

Figure 2:
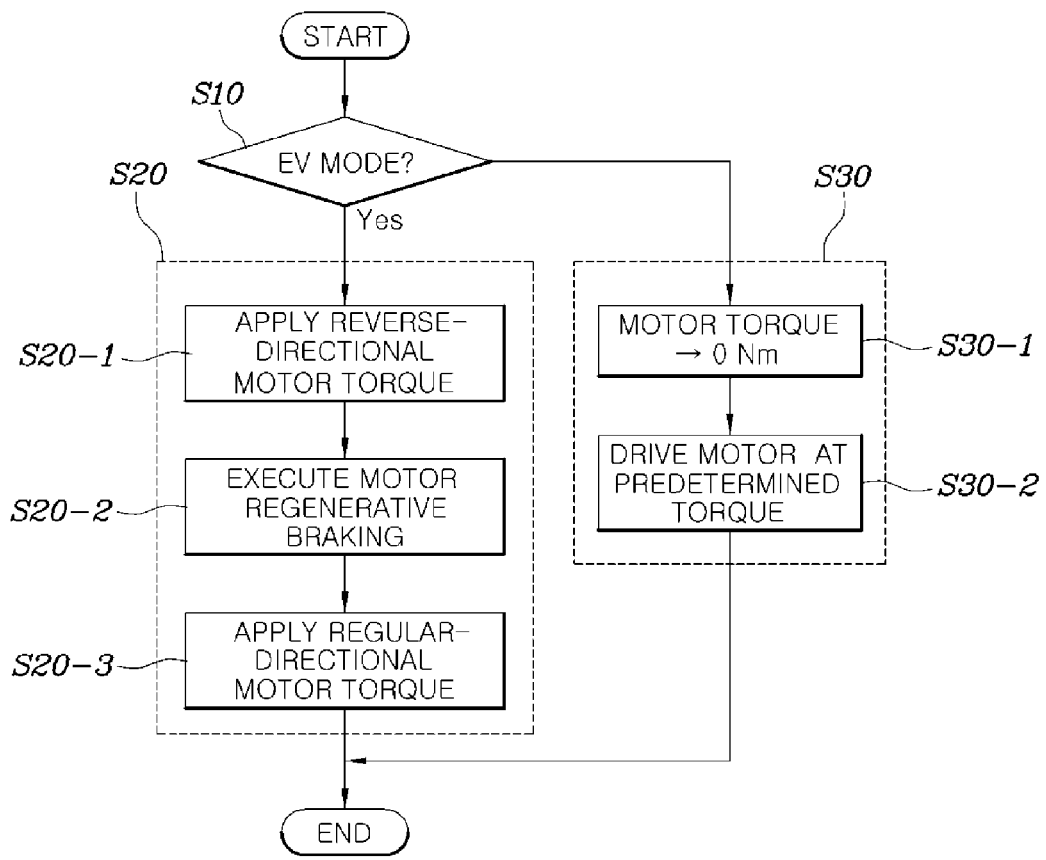
FIG. 2 is a flowchart illustrating a control method of a hybrid vehicle.

With reference to FIG. 2, a control method of a hybrid vehicle may include; confirming whether or not the driving mode of the vehicle is an EV mode if the controller 6 senses shift of the position of a shift lever from the position R to the position D or from the position D to the position R (Operation S10); applying reverse-directional motor torque to the motor 5 through the controller 6 so that a motor speed is synchronized with an engagement-side clutch speed (Operation S20-1); and applying regular-directional motor torque to the motor 5 through the controller 6 (Operation S20-3) after synchronization of the motor speed with the engagement-side clutch speed (Operation S20-1).

In more detail, if the controller 6 senses position shift of the shift lever through the TCU 8 and senses R-D position shift or D-R position shift, the driving mode of the vehicle is confirmed through a high level controller, i.e., a hybrid control unit (HCU). Such operation serves to confirm engagement/release of the engine clutch 3. The reason for this is that, only if the driving mode is the EV mode such that the engine clutch 3 is released, the motor 5 may be controlled with reverse-directional motor torque.

If it is sensed that the vehicle is in the EV mode, the controller 6 releases a release-side clutch of the transmission 7. Further, the controller 6 may apply reverse-directional motor torque to the motor 5, thus synchronizing the rotating speed of the motor 5 with the speed of an engagement-side clutch within the transmission 7.

Thereby, the motor speed may be rapidly synchronized with the engagement-side clutch speed and, thus, the engagement-side clutch may be rapidly engaged. That is, when the motor speed is synchronized with the engagement-side clutch speed, the controller 6 applies torque to the engagement-side clutch through the TCU 8 and regular-directional motor torque to the motor 5 and may thus drive the vehicle in a changed direction. Therefore, during R-D or D-R lurch driving, the driving direction of the vehicle may be rapidly changed and overheating of the clutch may be inhibited or prevented by reducing a slip amount generated due to a difference between the motor speed and the engagement-side clutch speed.

Further, if the motor speed is synchronized with the engagement-side clutch speed in Operation S20-1, the controller 6 may execute regenerative braking of the motor 5 until the motor speed reaches 0 RPM (Operation S20-2), and then execute normal driving (Operation S20-3).

That is, when the motor speed is synchronized with the engagement-side clutch speed, the controller 6 applies torque to the engagement-side clutch through the TCU 8 and thus engages the engagement-side clutch. Thereby, rotating force of the vehicle wheels due to inertia driving is transmitted to the motor 5 and such rotating force is used to increase the rotating speed of the motor 5 in the regular direction and, thus, the speed of change of the driving direction of the vehicle from forward driving to reverse driving or from reverse driving to forward driving may be increased.

The controller 6 may execute the above-described motor regenerative driving until the motor speed becomes 0 RPM and applies regular-directional torque to the motor 5 when the motor speed reaches 0 RPM, thus driving the vehicle in the changed direction. Such Operations S20-1, S20-2 and S20-3 may be commonly referred to as engagement control (Operation S20).

Figure 3:
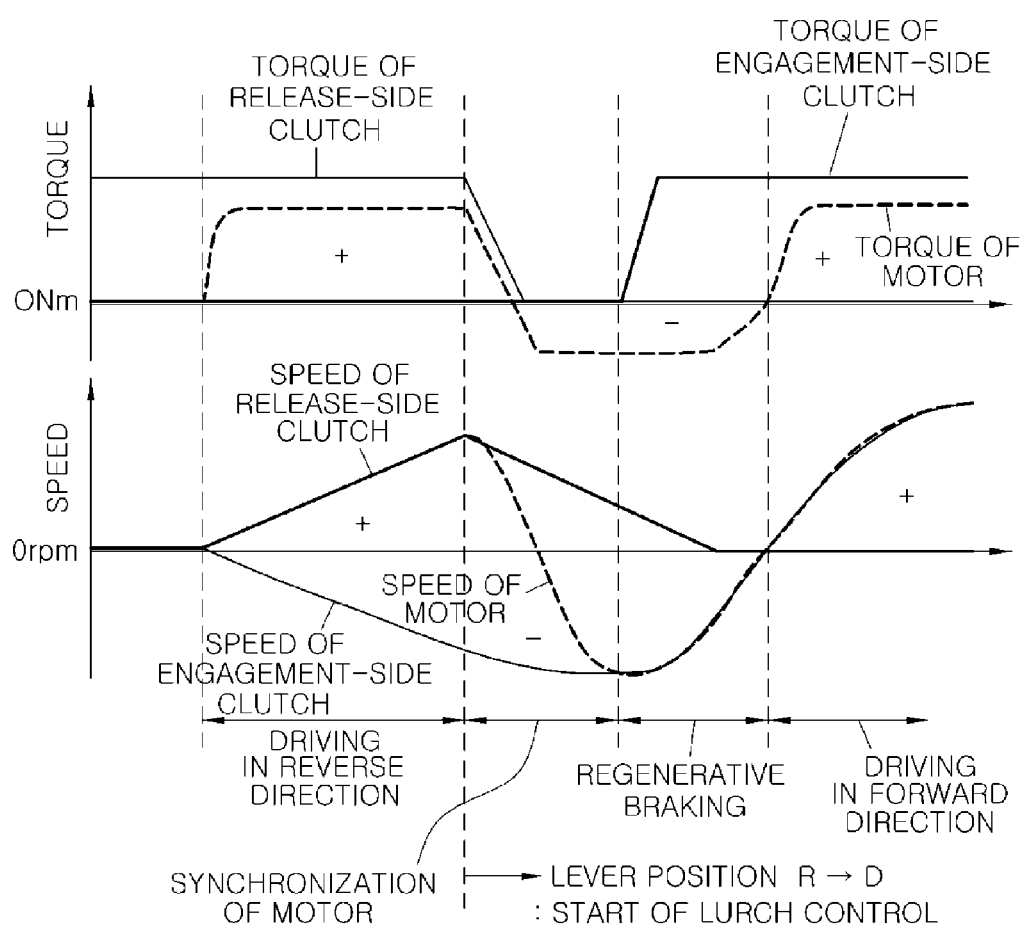
FIG. 3 is a graph illustrating control of a vehicle if the driving mode of the vehicle is an EV mode during R-D lurch driving.

FIG. 3 is a graph illustrating control of a vehicle if the driving mode of the vehicle is an EV mode during R-D lurch driving. With reference to FIG. 3, when the position of the shift lever is changed, the motor speed is rapidly synchronized with the engagement-side clutch speed by applying reverse-directional motor torque. When the motor speed is synchronized with the engagement-side clutch speed, the engagement-side clutch is engaged by applying torque to the engagement-side clutch, thus executing regenerative braking in which the speeds of the motor and the engagement-side clutch are increased through the rotating force of the vehicle wheels. Thereafter, the vehicle may be driven in the changed direction by applying regular-directional motor torque.

On the other hand, the control method may further include executing take-up control in which the controller 6 drives the motor 5 at a predetermined torque so that the motor speed and the engagement-side clutch speed are synchronized (Operation S30), as a result of confirmation of the driving mode (Operation S10), if the driving mode of the vehicle is not the EV mode.

That is, if the driving mode of the vehicle is not the EV mode, driving of the vehicle including driving force of the engine 1 is controlled and, thus, the motor 5 connected to the engine 1 may not be driven in the reverse direction. Therefore, when R-D or D-R lurch driving is generated, the controller 6 applies engagement-side clutch torque through the TCU 8 while driving the motor 5 at the predetermined torque, thus increasing the speed of the engagement-side clutch while slipping. By increasing the engagement-side clutch speed so as to be synchronized with the motor speed, the engagement-side clutch may be engaged.

Here, the predetermined torque may have a torque value set such that the motor 5 maintains the rotating speed of a specific value or more. The predetermined torque is varied according to kinds of vehicles and is not limited to a specific value.

Further, in execution of take-up control (Operation S30), the controller 6 controls the motor torque to be 0 Nm and then drives the motor 5 at the predetermined torque, thus smoothly releasing the release-side clutch.

Figure 4:
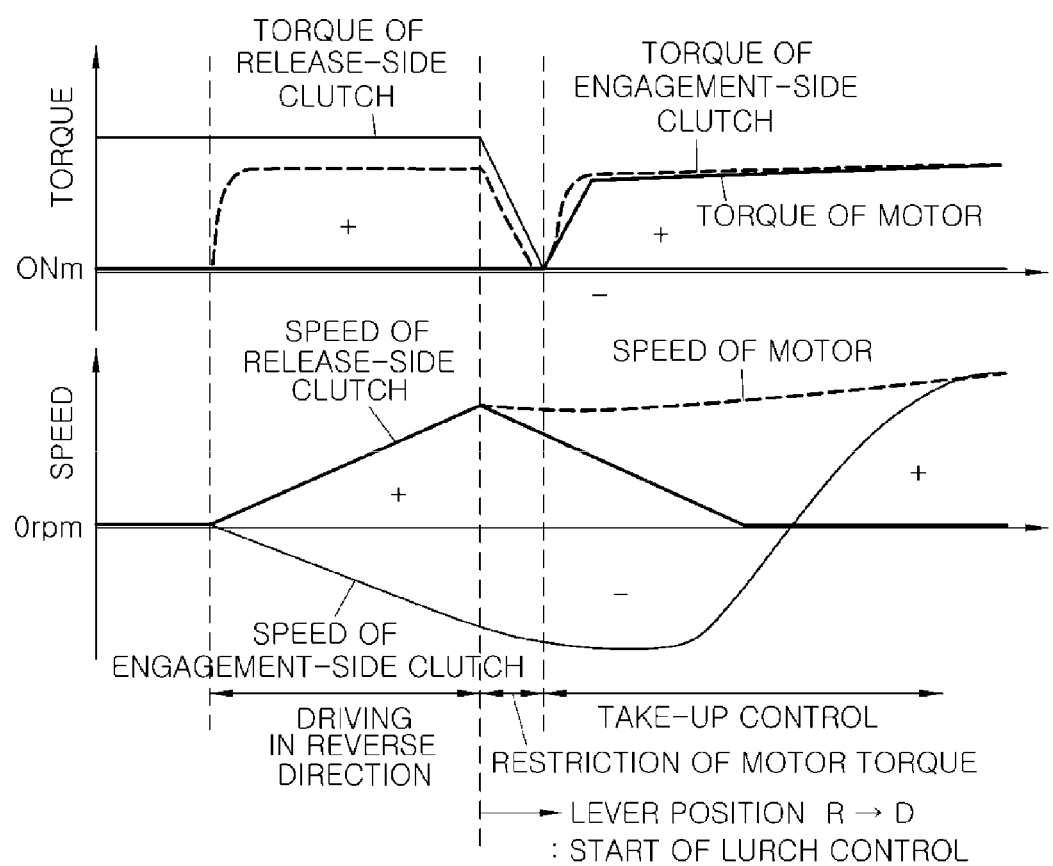
FIG. 4 is a graph illustrating control of a vehicle if the driving mode of the vehicle is not the EV mode during R-D lurch driving.

FIG. 4 is a graph illustrating control of a vehicle if the driving mode of the vehicle is not the EV mode during R-D lurch driving. With reference to FIG. 4, when the position of the shift lever is changed, the motor speed is primarily restricted to 0 Nm while the release-side clutch is released and, then, torque is applied to the engagement-side clutch while the motor is controlled at the predetermined torque. Thereby, the engagement-side clutch slips and the speed thereof is increased, thus allowing the vehicle to be driven in the changed direction.

That is, if the driving mode of the vehicle is not the EV mode, the motor speed may not be rapidly synchronized with the engagement-side clutch speed by controlling the motor 5 in the reverse direction and, thus, take-up control may be executed so that the engagement-side clutch slips and is engaged.

For convenience of understanding of the description, the controller 6 may be a motor control unit (MCU).

As is apparent from the above description, in a control method of a hybrid vehicle in accordance with the present disclosure, if the vehicle is in an EV mode during R-D or D-R lurch driving, a motor speed is rapidly synchronized with the speed of an engagement-side clutch and then the engagement-side clutch is engaged, thereby improving driving responsiveness of the vehicle and reducing the slip amount of the engagement-side clutch to prevent overheating of the clutch.

Further, during lurch driving in the EV mode, motor regenerative braking is executed, thereby rapidly performing direction change of the vehicle and reducing heat generated from the clutch.

Although the embodiments of the present disclosure have been disclosed for illustrative purposes, those skilled in the art will appreciate that various modifications, additions and substitutions are possible, without departing from the scope and spirit of the present disclosure.

What is claimed is:

1. A control method of a hybrid vehicle, comprising:
confirming whether or not a driving mode of a vehicle is an EV mode when a controller senses shift of a position of a shift lever from a position R to a position D or from the position D to the position R;
applying a reverse-directional motor torque to a motor through the controller so that a motor speed is synchronized with a speed of an engagement-side clutch when the driving mode of the vehicle is the EV mode; and
executing normal driving of the vehicle by applying a regular-directional motor torque to the motor through the controller after synchronization of the motor speed with the engagement-side clutch speed.

2. The control method according to claim 1, wherein, when the motor speed is synchronized with the speed of the engagement-side clutch, the controller executes regenerative braking of the motor until the motor speed reaches 0 RPM, and then executes normal driving of the vehicle.

3. The control method according to claim 1, further comprising, executing take-up control by driving the motor at a predetermined torque through the controller so that the motor speed and the engagement-side clutch speed are synchronized when the driving mode of the vehicle is not the EV mode.

4. The control method according to claim 3, wherein, in the executing take-up control, the controller controls the motor torque to be 0 Nm and then drives the motor at predetermined torque.

* * * * *